United States Patent
Chen et al.

(10) Patent No.: US 11,853,713 B2
(45) Date of Patent: Dec. 26, 2023

(54) GRAPH SIMILARITY ANALYTICS

(71) Applicant: International Business Machines Corporation, Armonk, NY (US)

(72) Inventors: Pin-Yu Chen, White Plains, NY (US); Lingfei Wu, Elmsford, NY (US); Chia-Yu Chen, White Plains, NY (US); Yada Zhu, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 15/954,891

(22) Filed: Apr. 17, 2018

(65) Prior Publication Data
US 2019/0317728 A1  Oct. 17, 2019

(51) Int. Cl.
*G06F 16/00* (2019.01)
*G06F 7/20* (2006.01)
*G06N 20/00* (2019.01)
*G06F 16/23* (2019.01)
*G06F 16/901* (2019.01)

(52) U.S. Cl.
CPC ............ *G06F 7/20* (2013.01); *G06F 16/2379* (2019.01); *G06F 16/9024* (2019.01); *G06N 20/00* (2019.01)

(58) Field of Classification Search
CPC .... G06F 7/20; G06F 16/2379; G06F 16/9024; G06N 20/00
USPC ........................................................ 707/758
See application file for complete search history.

(56) References Cited

U.S. PATENT DOCUMENTS

| | | |
|---|---|---|
| 6,684,205 B1 * | 1/2004 | Modha ................ G06K 9/6223 |
| 7,689,559 B2 | 3/2010 | Canright et al. |
| 8,019,748 B1 | 9/2011 | Wu et al. |
| 8,588,531 B2 | 11/2013 | Hido et al. |

(Continued)

FOREIGN PATENT DOCUMENTS

| | | |
|---|---|---|
| CN | 1841380 A | 10/2006 |
| CN | 103314572 A | 9/2013 |

(Continued)

OTHER PUBLICATIONS

Papadimitriou et al.; "Web Graph Similarity for Anomaly Detection"; http://www.researchgate.net/publication/225625329, Mar. 20, 2009, 21 pages.*

(Continued)

*Primary Examiner* — Monica M Pyo
(74) *Attorney, Agent, or Firm* — Amin, Turocy & Watson, LLP

(57) ABSTRACT

Techniques that facilitate graph similarity analytics are provided. In one example, a system includes an information component and a similarity component. The information component generates a first information index indicative of a first entropy measure for a first graph-structured dataset associated with a machine learning system. The information component also generates a second information index indicative of a second entropy measure for a second graph-structured dataset associated with the machine learning system. The similarity component determines similarity between the first graph-structured dataset and the second graph-structured dataset based on a graph similarity computation associated with the first information index and the second information index.

12 Claims, 12 Drawing Sheets

(56) References Cited

U.S. PATENT DOCUMENTS

| | | | |
|---|---|---|---|
| 8,935,249 B2 | 1/2015 | Traub et al. | |
| 9,349,105 B2* | 5/2016 | Beymer | G06N 20/00 |
| 9,576,031 B1* | 2/2017 | Aggarwal | G06F 16/248 |
| 9,622,091 B2 | 4/2017 | Garg et al. | |
| 9,852,231 B1* | 12/2017 | Ravi | G06F 16/9024 |
| 10,305,758 B1* | 5/2019 | Bhide | G06F 16/2477 |
| 10,673,880 B1* | 6/2020 | Pratt | H04L 63/1425 |
| 2003/0068082 A1* | 4/2003 | Comaniciu | G06K 9/6298 |
| | | | 382/162 |
| 2003/0115183 A1 | 6/2003 | Abdo et al. | |
| 2010/0034470 A1 | 2/2010 | Valencia-Campo et al. | |
| 2010/0083172 A1* | 4/2010 | Breeds | G06F 3/0482 |
| | | | 715/810 |
| 2011/0125764 A1* | 5/2011 | Carmel | G06F 16/3338 |
| | | | 707/749 |
| 2014/0079297 A1 | 3/2014 | Tadayon et al. | |
| 2014/0201126 A1 | 7/2014 | Zadeh et al. | |
| 2014/0276130 A1* | 9/2014 | Mirelman | A61B 5/162 |
| | | | 600/483 |
| 2014/0321761 A1 | 10/2014 | Wang et al. | |
| 2016/0247175 A1 | 8/2016 | Milton et al. | |
| 2016/0330066 A1 | 11/2016 | Tee | |
| 2017/0255693 A1 | 9/2017 | Trifunovic | |
| 2018/0075369 A1 | 3/2018 | Calmon et al. | |
| 2018/0160281 A1* | 6/2018 | Zweig | G06F 17/16 |

FOREIGN PATENT DOCUMENTS

| | | |
|---|---|---|
| CN | 104756491 A | 7/2015 |
| CN | 105144200 A | 12/2015 |
| CN | 105917382 A | 8/2016 |
| CN | 105989571 A | 10/2016 |
| CN | 106687952 A | 5/2017 |
| CN | 106874687 A | 6/2017 |
| WO | 2014080767 A1 | 5/2014 |

OTHER PUBLICATIONS

Mowshowitz et al., "Entropy and the Complexity of Graphs Revisited", Entropy 2012, pp. 559-570.*

Qiao et al., "How to Identify the Most Powerful Node in Complex Networks? A Novel Entropy Centrality Approach", Entropy 2017, 24 pages.*

Lin., "Divergence Measures Based on teh Sannon Entropy", IEEE Transactions on Information Theory, vol. 37, No. 1, Jan. 1991, 7 pages.*

C.E. Shannon, "The Bell System Technical Journal", The Bell System Technical Journal, (vol. 27, Issue: 3, Jul. 1948), 45 pages.*

Ali Mehri et al., "Word ranking in a single document by Jensen-Shannon divergence", http://www.dx.doi.org/10/1016/j-physleta.2015.04.030, 2015, 6 pages.*

Zhang Zhihong et al., "Graph Motif Entropy For Understanding Time-Evolving Networks", Journal of Latex Class Files, vol. 14, No. 8, Aug. 2015, 15 pages.*

Koutra, et al., "DELTACON: Principled Massive-Graph Similarity Function with Attribution," ACM Transactions on Knowledge Discovery from Data, vol. 10, No. 3, Article 28, Publication date: Feb. 2016, 43 pages.

Akoglu, et al., "Graph based anomaly detection and description: a survey," Data Min Knowl Disc (2015) 29: pp. 626-688.

Anonymous, "Task posting strategy based on characterization of online crowd workers," Publication Date: Sep. 9, 2014, 10 pages.

Anonymous, "A System & Method for Determining Similarity between Spatio—Temporal Behavior of Users," Publication Date: Feb. 18, 2016, 6 pages.

Anonymous, "Method for Mining Metadata in Data Lake/ Data Repository to Enable Self-driven Analytics," Publication Date: Aug. 3, 2016, 6 pages.

Adedoyin-Olowe, et al., "A Survey of Data Mining Techniques for Social Network Analysis," Last Accessed: Jan. 31, 2018, 25 pages.

Allahyari, et al., "A Brief Survey of Text Mining: Classification, Clustering and Extraction Techniques," arXiv:1707.02919v2 [cs.CL] Jul. 28, 2017, 13 pages.

De Domenico, et al., "Structural reducibility of multilayer networks," Published Apr. 23, 2015, Nature Communications | 6:6864 | DOI: 10.1038/ncomms7864, 9 pages.

Papadimitriou, et al., "Web graph similarity for anomaly detection," The Brazilian Computer Society 2010, 12 pages.

Chinese Office Action for Chinese Application No. 201910306083.X dated Nov. 14, 2022.

Mehri, et al., "Word ranking in a single document by Jensen-Shannon divergence", Physics Letters A 379 (Mar. 1, 2015), pp. 1627-1632.

Papadimitriou, et al., "Web graph similarity for anomaly detection," J Internet Serv Appl (Feb. 25, 2010) 1: 19-30, DOI: 10.1007/s13174-010-0003-x.

Chinese Office Action for Chinese Application No. 201910306083.X dated May 27, 2023, 7 pages.

Liu, Sh et al. | "SERGE: Successive Event Recommendation Based on Graph Entropy for Event-Based Social Networks." IEEE 2017, Special Section on Cyber-Physical-Social Computing and Networking, vol. 6, date of publication Dec. 25, 2017, date of current version Feb. 14, 2018, 11 pages.

Sboev, AI. et al. | "Visualization of Subtopics of the Thematic Document Collection Using the Context-Semantic Graph." 2015 International Conference on Computational Science and Computational Intelligence (CSCI), Las Vegas, NV, USA, 2015, pp. 47-52, doi: 10.1109/CSCI.2015.124, 6 pages.

Huaqiao University | "A Content-Based Image Retrieval System Based on HTC Index." China Academic Journal Electronic Publishing House, May 31, 2016, 64 pages.

* cited by examiner

GRAPH SIMILARITY ANALYTICS

TECHNICAL FIELD

The subject disclosure relates to digital systems, and more specifically, to data analysis systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate graph similarity analytics are described.

According to an embodiment, a system can comprise an information component and a similarity component. The information component can generate a first information index indicative of a first entropy measure for a first graph-structured dataset associated with a machine learning system. The information component can also generate a second information index indicative of a second entropy measure for a second graph-structured dataset associated with the machine learning system. The similarity component can determine similarity between the first graph-structured dataset and the second graph-structured dataset based on a graph similarity computation associated with the first information index and the second information index.

According to another embodiment, a computer-implemented method is provided. The computer-implemented method can comprise generating, by a system operatively coupled to a processor, a first information index indicative of a first entropy measure for a first graph-structured dataset. The computer-implemented method can also comprise generating, by the system, a second information index indicative of a second entropy measure for a second graph-structured dataset. Furthermore, the computer-implemented method can comprise determining, by the system, similarity between the first graph-structured dataset and the second graph-structured dataset based on a graph similarity computation associated with the first information index and the second information index. The computer-implemented method can also comprise performing, by the system, a machine learning process based on the similarity between the first graph-structured dataset and the second graph-structured dataset.

According to yet another embodiment, a computer program product for facilitating graph similarity analytics can comprise a computer readable storage medium having program instructions embodied therewith. The program instructions can be executable by a processor and cause the processor to generate, by the processor, a first entropy measure for a first graph data structure. The program instructions can also cause the processor to generate, by the processor, a second entropy measure for a second graph data structure. Furthermore, the program instructions can cause the processor to determine, by the processor, similarity between the first graph data structure and the second graph data structure based on a graph similarity computation associated with the first entropy measure and the second entropy measure. The program instructions can also cause the processor to perform, by the processor, a machine learning process based on the graph similarity computation associated with the first entropy measure and the second entropy measure.

According to yet another embodiment, a system can comprise an information component, a similarity component and an analysis component. The information component can generate a first entropy measure for a first graph-structured dataset and a second entropy measure for a second graph-structured dataset. The similarity component can determine similarity between the first graph-structured dataset and the second graph-structured dataset based on a graph similarity computation associated with the first entropy measure and the second entropy measure. The analysis component can perform data analysis associated with the first graph-structured dataset and the second graph-structured dataset based on the graph similarity computation.

According to yet another embodiment, a computer-implemented method is provided. The computer-implemented method can comprise generating, by a system operatively coupled to a processor, a set of information indexes indicative of a set of entropy measures associated with a set of sequential changes for a set of graph data structures. The computer-implemented method can also comprise determining, by the system, similarity between the set of graph data structures based on a graph similarity computation associated with the set of information indexes. Furthermore, the computer-implemented method can comprise performing, by the system, a machine learning process based on the similarity between the set of graph data structures.

DETAILED DESCRIPTION

Figure 1:
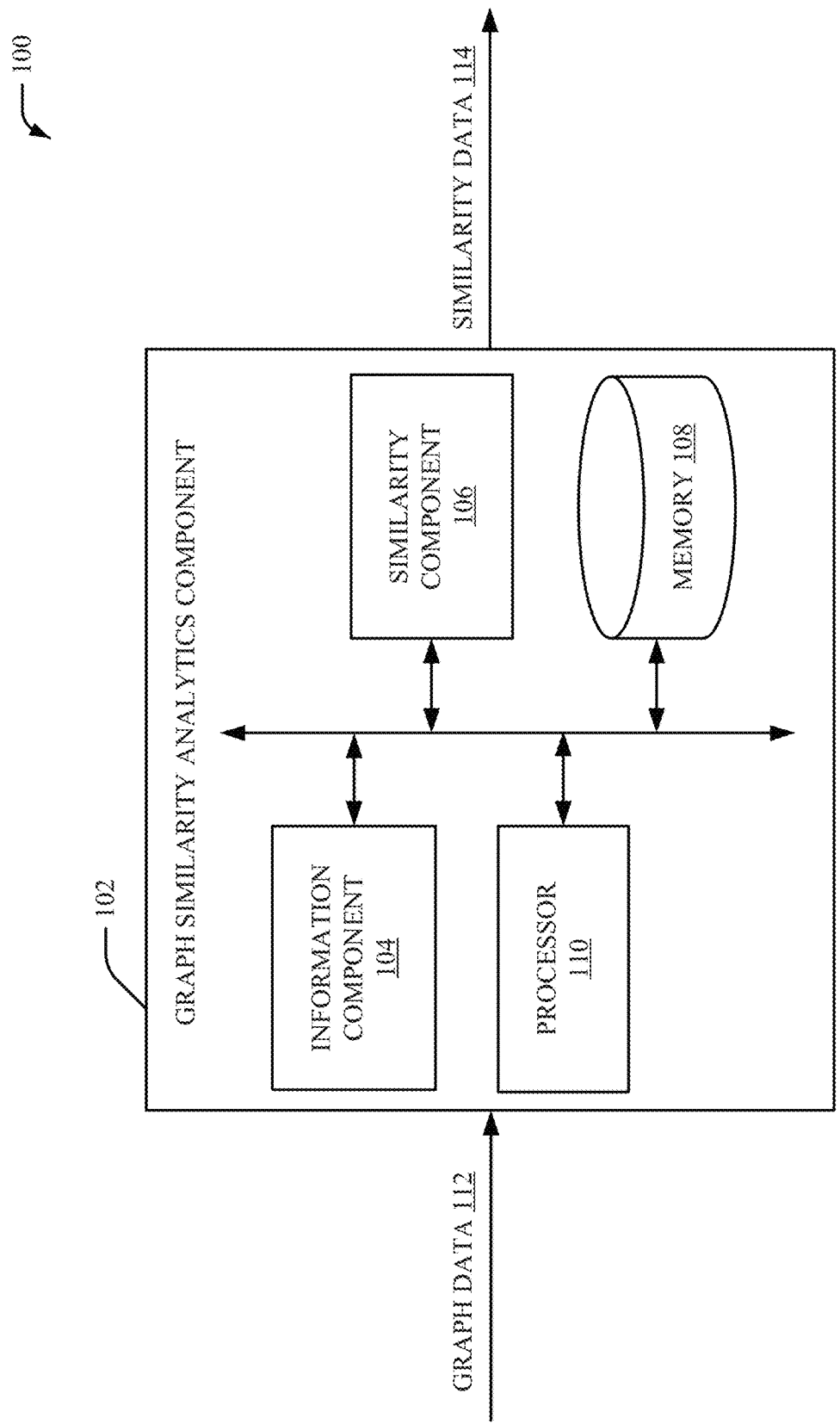
FIG. 1 illustrates a block diagram of an example, non-limiting system that includes a graph similarity component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A graph can be a representation of one or more relationships among inter-related data. For example, a graph can be a representation of one or more relationships among data samples, a digital version of a brain network, an online social network, a distributed system, etc. It is often desirable to determine graph similarity among numerous graphs to facilitate analytics for a technological system associated with numerous graphs. In one example, a graph can be converted into a vector representation to facilitate similarity among a graph and another graph that is converted into another vector representation. However, quantifying a similarity between graphs represented as vectors is generally difficult and/or computationally expensive. Furthermore, graphs represented as vectors generally cannot be employed for different graph tasks.

To address these and/or other issues, embodiments described herein include systems, computer-implemented methods, and computer program products that facilitate improved graph similarity analytics. In an embodiment, a graph similarity computation with improved processing speed can be performed based on an information distance computation indicative of a similarity distance between graphs. In an example, a graph can be associated with a technical application such as brain network analysis associated with a digital representation of a brain network, anomaly detection in dynamic networked systems, online graph analytics, streaming data graph analytics, temporal analysis in biological networks, graph pattern mining, graph pattern searches, another technical application, etc. In an aspect, the information distance can be computed for multi-task graph mining. In another aspect, memory consumption can be reduced by tracking changes to a graph. Furthermore, computation complexity can be reduced by performing a graph similarity computation based on an information distance computation. In yet another aspect, an information index associated with an entropy measure can be determined for a set of graphs. Additionally, the graph similarity computation can be performed based on the information index for the set of graphs. In another embodiment, the information distance can be applied to a machine learning system related to graphs and/or an artificial intelligence system related to graphs. As such, accuracy of a similarity computation between graphs can be improved. In another embodiment, a fast graph entropy computation can be performed on a set of single graphs or sequential graph changes. A fast graph similarity computation can be performed based on the fast graph entropy computation. The fast graph similarity computation can be employed by a machine learning system and/or an artificial intelligence system. For example, spatial-temporal network analysis can be performed based on the fast graph similarity computation. In another example, anomaly detection can be performed based on the fast graph similarity computation. In yet another example, graph clustering and/or classification can be performed based on the fast graph similarity computation. In certain embodiments, data visualization and/or user interaction can be employed to facilitate the fast graph similarity computation. Accordingly, accuracy of data generated by a machine learning process associated with graphs can be improved, quality of a machine learning process associated with graphs can be improved, speed of data generated by a machine learning process associated with graphs can be improved, and/or a cost for analyzing data using a machine learning process associated with graphs can be reduced. Furthermore, memory consumption associated with graph similarity analytics, processing consumption associated with graph similarity analytics, and/or computation complexity associated with graph similarity analytics can be reduced. Additionally, efficiency and/or performance of a graph similarity analytics process and/or a machine learning process associated with graphs can be improved. Moreover, a number of different graph tasks capable of being performed by a machine learning system and/or an artificial intelligence system can be improved.

FIG. 1 illustrates a block diagram of an example, non-limiting system 100 that facilitates graph similarity analytics in accordance with one or more embodiments described herein. In various embodiments, the system 100 can be a graph similarity analytics system associated with technologies such as, but not limited to, data analysis technologies, data analytics technologies, graph database technologies, graph computing technologies, cloud computing technologies, computer technologies, server technologies, information technologies, machine learning technologies, artificial intelligence technologies, digital technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with graph similarity analytics component, etc.) for carrying out defined tasks related to graph similarity analytics and/or machine learning. The system 100 and/or components of the system can be employed to solve new problems that arise through advancements in technologies mentioned above, employment of cloud-computing systems, and/or computer architecture, and the like. One or more embodiments of the system 100 can provide technical improvements to graph similarity analytics system associated with technologies such as, but not limited to, data analysis systems, data analytics systems, graph database systems, graph computing systems, cloud computing systems, computer systems, server systems, information systems, machine learning systems, artificial intelligence systems, digital systems, and/or other systems. One or more embodiments of the system 100 can also provide technical improvements to a processing unit (e.g., a processor) associated with graph similarity analytics by improving processing performance of the processing unit, improving processing efficiency of the processing unit, and/or reducing an amount of time for the processing unit to perform a graph similarity analytics process. One or more embodiments of the system 100 can also provide technical improvements to a graph similarity analytics system by improving processing performance of the graph similarity analytics system, improving processing efficiency of the graph similarity analytics system, reducing memory storage employed by the graph similarity analytics system, and/or reducing computation complexity associated with the graph similarity analytics system. In one example, the system 100 can be associated with a graph similarity analytics process.

In the embodiment shown in FIG. 1, the system 100 can include a graph similarity analytics component 102. As shown in FIG. 1, the graph similarity analytics component 102 can include an information component 104 and a similarity component 106. Aspects of the graph similarity analytics component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the graph similarity analytics component 102 can also include memory 108 that stores computer executable components and instructions. Furthermore, the graph similarity analytics component 102 can include a processor 110 to facilitate execution of the instructions (e.g., computer executable components and corresponding instructions) by the graph similarity analytics component 102. As shown, the information component 104, the similarity component 106, the memory 108 and/or the processor 110 can be electrically and/or communicatively coupled to one another in one or more embodiments. In certain embodiments, the graph similarity analytics component 102 can be in communication with a machine learning system and/or a graph database system.

The graph similarity analytics component 102 (e.g., the information component 104 of the graph similarity analytics component 102) can receive graph data 112. The graph data 112 can be indicative of information associated with data elements that compose one or more graphs. A graph can be a data structure (e.g., a graph-structured dataset) that represents data as a network of nodes (e.g., vertices) where a relationship between the nodes can be represented as connections (e.g., edges). The graph data 112 can include information associated with one or more data structures associated with a network of nodes. Additionally, in certain embodiments, the graph data 112 can include metadata that provides attributes and/or properties for one or more data structures associated with a network of nodes. As such, the graph data 112 can be associated with data for a set of graph-structured datasets. In an aspect, the graph data 112 can include information for a set of graph-structured dataset associated with a machine learning system. For example, the graph data 112 can include information for a set of graph-structured dataset to be processed and/or analyzed by a machine learning system. In an embodiment, the graph data 112 can include information for a set of single graphs. For example, the graph data 112 can include first information for a first data structure associated with a first network of nodes and connections, second information for a second data structure associated with a second network of nodes and connections, etc. In an aspect, data associated with the set of single graphs can be fixed. In another aspect, the set of single graphs can be associated with a set of snapshots for the graphs that is captured over time. For instance, the set of single graphs can be a sequence of graphs over time. As such, the set of single graphs can be associated with a sequential network snapshot for the graphs. In one example, the set of single graphs can be associated with spatial-temporal data. In another embodiment, the graph data 112 can include information for sequential graph changes. For example, the graph data 112 can include information associated with changes in a graph sequence for a graph or a set of graphs.

The information component 104 can generate entropy data associated with the graph data 112. For instance, the information component 104 can generate entropy data indicative of a set of information indexes associated with a set of entropy measures for the graph data 112. The entropy data can be, for example, a measure of an average amount of data contained in the graph data 112. Furthermore, the entropy data can be, for example, a measure of an amount of uncertainty in data included in the graph data 112. In an embodiment, the information component 104 can generate a first entropy measure for a first graph-structured dataset, the information component 104 can generate a second entropy measure for a second graph-structured dataset, etc. For instance, the information component 104 can generate a first information index indicative of a first entropy measure for a first graph-structured dataset associated with the graph data 112, a second information index indicative of a second entropy measure for a second graph-structured dataset associated with the graph data 112, etc. The first entropy measure can be, for example, a measure of an average amount of data contained in the first graph-structured dataset. Furthermore, the first entropy measure can be, for example, a measure of an amount of uncertainty in data included in the first graph-structured dataset. In addition, the second entropy measure can be, for example, a measure of an average amount of data contained in the second graph-structured dataset. Furthermore, the second entropy measure can be, for example, a measure of an amount of uncertainty in data included in the second graph-structured dataset. In an aspect, the information component 104 can calculate an average amount of data contained in the graph data 112. For example, the information component 104 can calculate an average amount of data contained in the first graph-structured dataset. Additionally, the information component 104 can calculate an average amount of data contained in the second graph-structured dataset. In certain embodiments, the information component 104 can update the first information index based on a set of sequential changes associated with the first graph-structured dataset. Additionally or alternatively, the information component 104 can update the second information index based on a set of sequential changes associated with the second graph-structured dataset.

The similarity component 106 can determine similarity between data included in the graph data 112. In an embodiment, the similarity component 106 can determine similarity between the first graph-structured dataset and the second graph-structured dataset based on a graph similarity computation associated with the first entropy measure and the second entropy measure. For instance, the similarity component 106 can determine similarity between the first graph-structured dataset and the second graph-structured dataset based on a graph similarity computation associated with the first information index and the second information index. The graph similarity computation can determine, for example, an information distance between the first information index and the second information index. For instance, the information distance can be a Jensen-Shannon divergence measurement associated with a probability distribution between the first information index and the second information index. In an embodiment, the similarity component 106 can generate similarity data 114. The similarity data 114 can include information associated with the similarity between the first graph-structured dataset and the second graph-structured dataset. For example, the similarity data 114 can include information associated with the graph similarity computation. In one example, the similarity data 114 can include information associated with the information distance between the first information index and the second information index. In an embodiment, the information component 104 can generate the first information index and the second information index to facilitate reduced memory consumption and/or reduced computation complexity to determine the similarity data 114 (e.g., to determine the similarity between the first graph-structured dataset and the second graph-structured dataset).

It is to be appreciated that the graph similarity analytics component 102 (e.g., the information component 104 and/or the similarity component 106) performs a graph similarity process and/or a graph similarity analytics process associated with graph data that cannot be performed by a human (e.g., is greater than the capability of a single human mind). For example, an amount of data processed, a speed of processing of data (e.g., a speed of processing data associated with multiple parties) and/or data types processed by the graph similarity analytics component 102 (e.g., the information component 104 and/or the similarity component 106) over a certain period of time can be greater, faster and different than an amount, speed and data type that can be processed by a single human mind over the same period of time. The graph similarity analytics component 102 (e.g., the information component 104 and/or the similarity component 106) can also be fully operational towards performing one or more other functions (e.g., fully powered on, fully executed, etc.) while also performing the above-referenced graph similarity process and/or graph similarity analytics process associated with graph data. Moreover, the graph similarity analytics component 102 (e.g., the information component 104 and/or the similarity component 106) can determine information that is impossible to obtain manually by a user. For example, a type of information included in the similarity data 114, an amount of information included in the similarity data 114 and/or a variety of information included in the similarity data 114 can be more complex than information obtained manually by a user.

Figure 2:
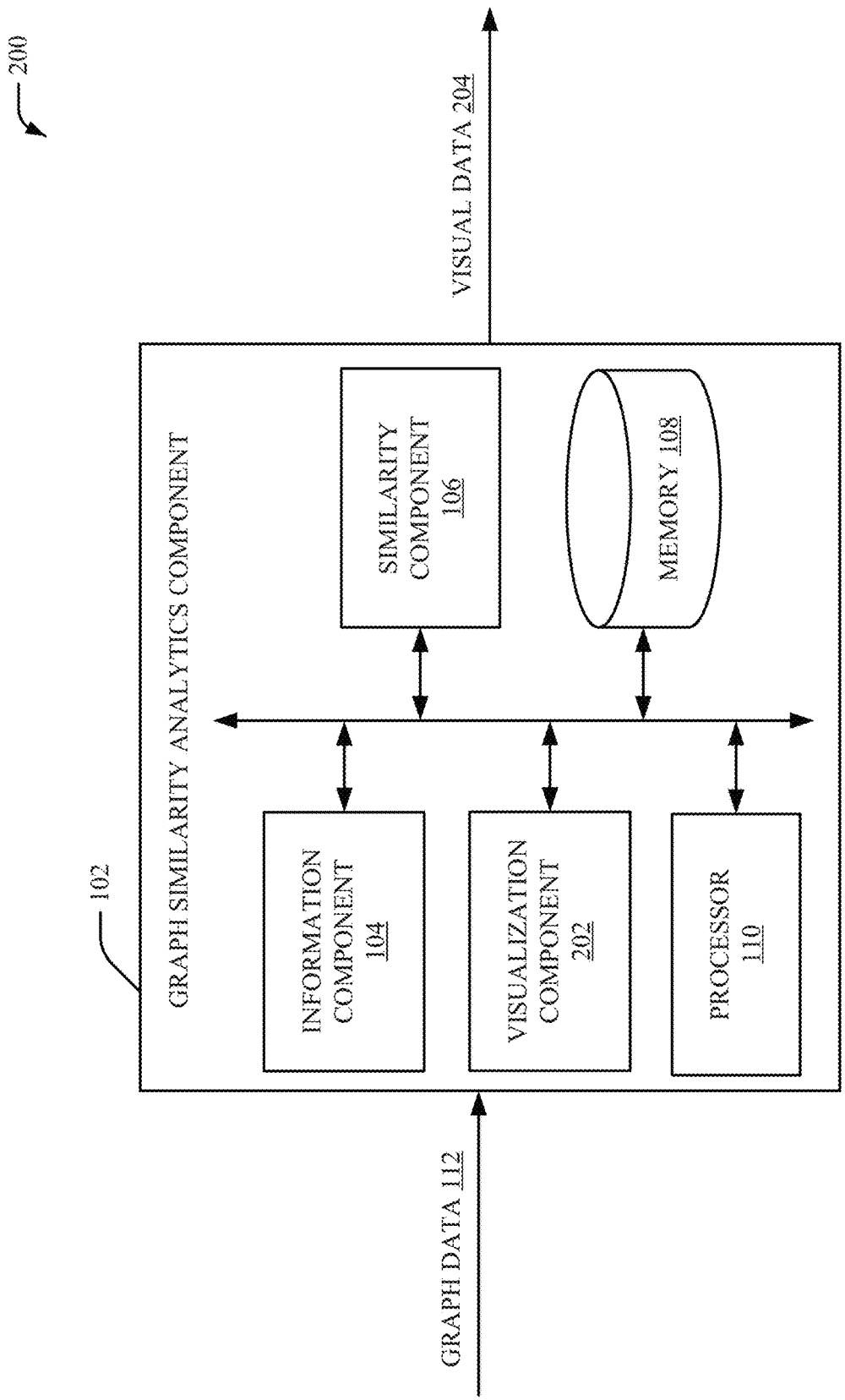
FIG. 2 illustrates a block diagram of another example, non-limiting system that includes a graph similarity component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the graph similarity analytics component 102. The graph similarity analytics component 102 can include the information component 104, the similarity component 106, a visualization component 202, the memory and/or the processor 110. The visualization component 202 can facilitate data visualization associated with the similarity data 114 generated by the similarity component 106. For instance, the visualization component 202 can generate visual data 204 associated with the similarity data 114 generated by the similarity component 106. In an aspect, the similarity data 114 can be rendered on a display as one or more dynamic visual elements where visual characteristics (e.g., content, visual property, size, hue, shading, etc.) of the visual data 204 can be altered based on the similarity data 114. In an embodiment, the visualization component 202 can facilitate display of information associated with the similarity data 114. For instance, the visualization component 202 can render information associated with the similarity data 114 on a display device. The display device can be, for example, a computing device with a display, a computer, a desktop computer, a laptop computer, a monitor device, a smart device, a smart phone, a mobile device, a handheld device, a tablet, a wearable device, a portable computing device or another type of device associated with a display. In an aspect, the visualization component 202 can generate a user interface to display at least a portion of information associated with the similarity data 114 in a human interpretable format. In one example, the visual data 204 can be indicative of visual statistics associated with the similarity between the first graph-structured dataset and the second graph-structured dataset. In one example, the visual data 204 can be indicative of information associated with spatial-temporal network diagnosis of the graph data 112. In certain embodiments, the visualization component 202 can provide user interaction associated with the visual data 204. For instance, the visualization component 202 can generate the visual data based on user data. The user data indicative of real-time user feedback provided by a display device. In one example, the user data can be indicative of real-time user feedback associated with a machine learning system that processes and/or analyzes the similarity data 114. In certain embodiments, the user data can facilitate modification of a graph similarity analytics process and/or a machine learning process associated with the graph similarity analytics component 102. For example, a graph similarity analytics process associated with the graph similarity analytics component 102 can be repeated to improve a degree of similarity between graphs based on the user data. In another example, a machine learning process associated with the graph similarity analytics component 102 can be repeated to improve anomaly detection and/or classification associated with graphs based on the user data.

Figure 3:
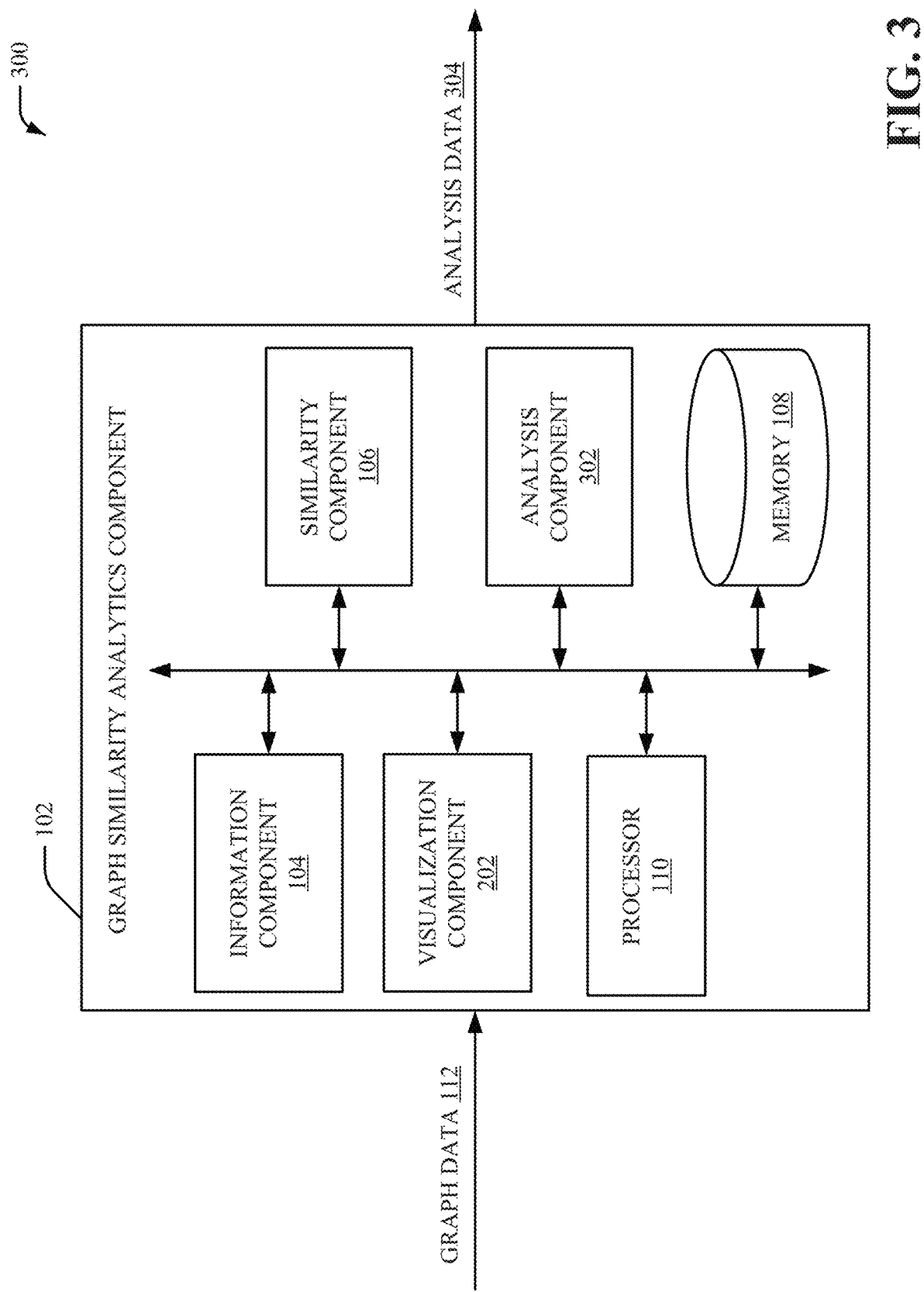
FIG. 3 illustrates a block diagram of yet another example, non-limiting system that includes a graph similarity component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the graph similarity analytics component 102. The graph similarity analytics component 102 can include the information component 104, the similarity component 106, the visualization component 202, an analysis component 302, the memory and/or the processor 110. The analysis component 302 can employ the similarity data 114 to perform analysis of the graph data 112. In an embodiment, the analysis component 302 can perform spatial-temporal analysis of the graph data 112 based on the similarity data 114. In another embodiment, the analysis component 302 can perform anomaly detection associated with the graph data 112 based on the similarity data 114. In yet another embodiment, the analysis component 302 can perform graph clustering and/or classification of the graph data 112 based on the similarity data 114. In an aspect, the analysis component 302 can employ a graph similarity computation associated with a first information index and a second information index associated with the graph data 112 to perform analysis of the graph data 112 (e.g., analysis of a first graph-structured dataset and a second graph-structured dataset). In another aspect, the analysis component 302 can employ similarity between a first graph-structured dataset and a second graph-structured dataset associated with the graph data 112 for task-dependent analysis of data associated with a machine learning system. The analysis component 302 can generate analysis data 304 based on the analysis of the graph data 112 using the similarity data 114. The analysis data 304 can include, for example, information associated with the spatial-temporal analysis, the anomaly detection, the graph clustering and/or the classification associated with the graph data 112 and/or the similarity data 114.

Figure 4:
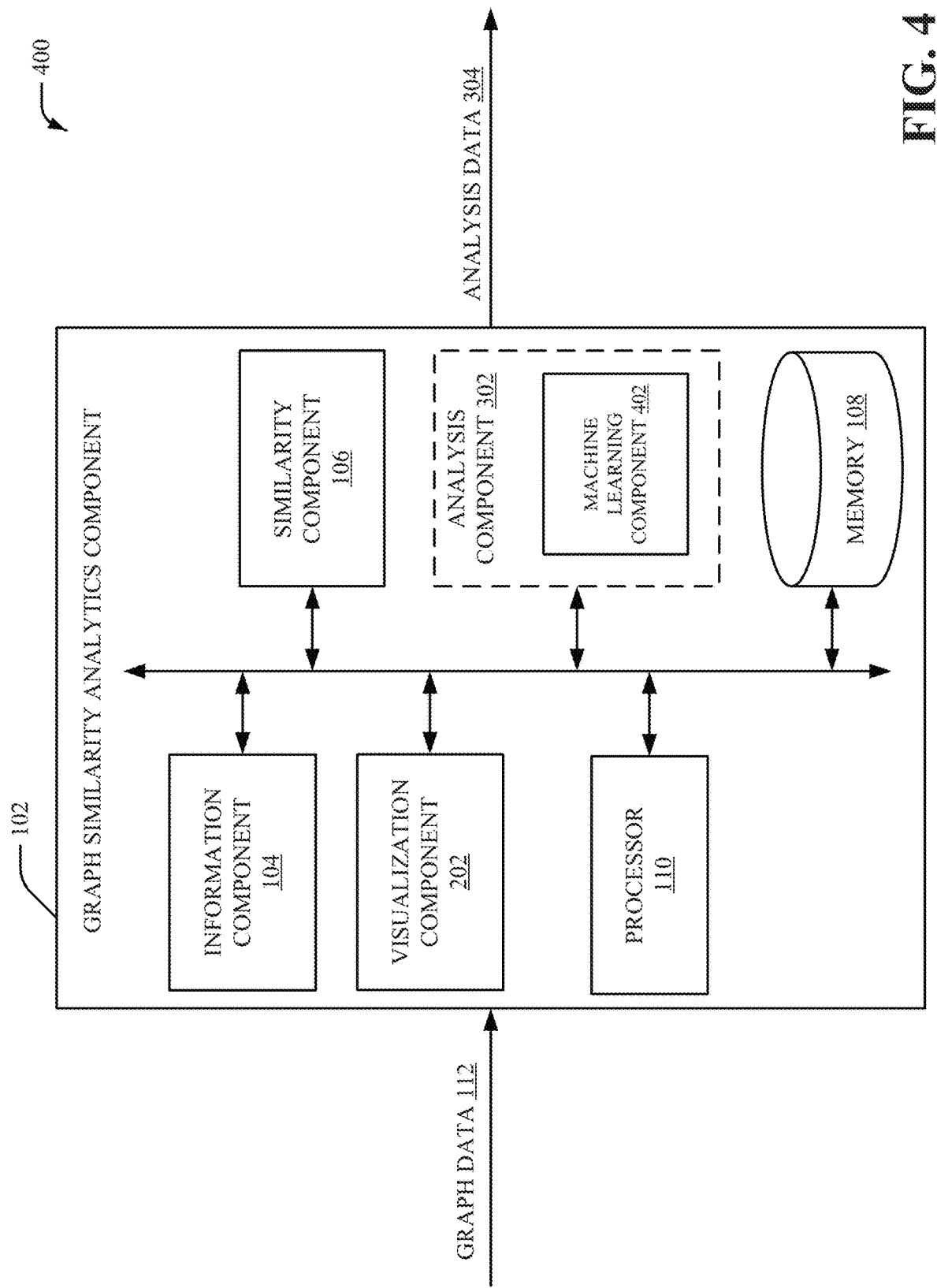
FIG. 4 illustrates a block diagram of yet another example, non-limiting system that includes a graph similarity component in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the graph similarity analytics component 102. The graph similarity analytics component 102 can include the information component 104, the similarity component 106, the visualization component 202, the analysis component 302, the memory and/or the processor 110. The analysis component 302 can include a machine learning component 402. The machine learning component 402 can perform one or more machine learning processes to facilitate analysis of the graph data 112 based on the similarity data 114. In an embodiment, the machine learning component 402 can employ machine learning and/or principles of artificial intelligence (e.g., a machine learning process) to learn one or more features and/or information related to the graph data 112 using, for example, the similarity data 114. In an aspect, the machine learning component 402 can employ machine learning and/or principles of artificial intelligence (e.g., a machine learning process) to generate the analysis data 304. The machine learning component 402 can perform learning with respect to learning one or more features and/or information related to the graph data 112 explicitly or implicitly. In an aspect, the machine learning component 402 can learn one or more features and/or information related to the graph data 112 based on classifications, correlations, inferences and/or expressions associated with principles of artificial intelligence. For instance, the machine learning component 402 can employ an automatic classification system and/or an automatic classification process to learn one or more features and/or information related to the graph data 112. In one example, the machine learning component 402 can employ a probabilistic and/or statistical-based analysis (e.g., factoring into the analysis utilities and costs) to learn and/or generate inferences with respect to the graph data 112. In an aspect, the machine learning component 402 can include an inference component (not shown) that can further enhance automated aspects of the machine learning component 402 utilizing in part inference based schemes to learn one or more features and/or information related to the graph data 112.

The machine learning component 402 can employ any suitable machine-learning based techniques, statistical-based techniques and/or probabilistic-based techniques. For example, the machine learning component 402 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 402 can perform a set of machine learning computations associated with learning one or more features and/or information related to the graph data 112. For example, the machine learning component 402 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine learning computations, a set of deep belief network computations, and/or a set of different machine learning computations to learn one or more features and/or information related to the graph data 112.

Figure 5:
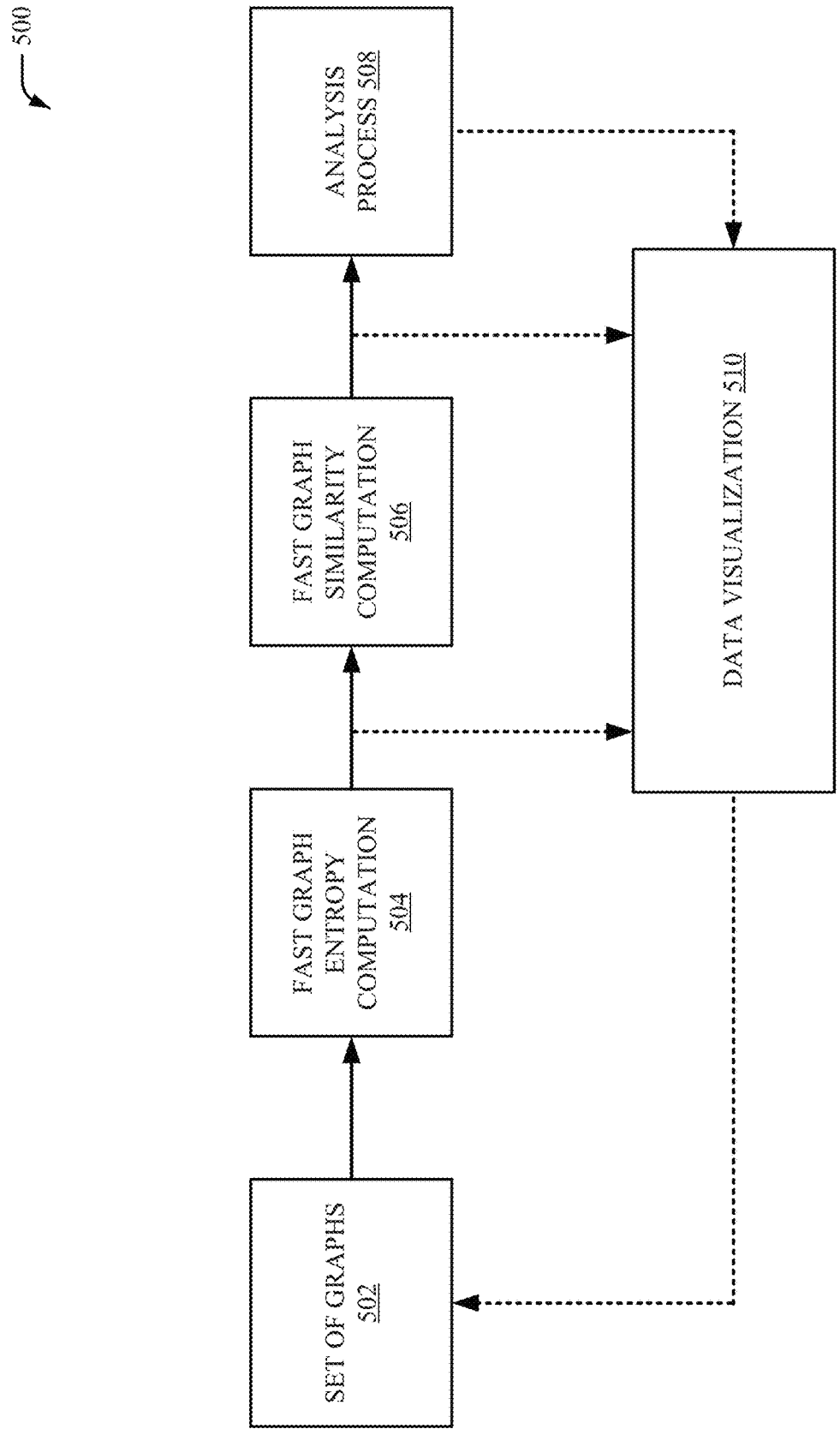
FIG. 5 illustrates an example, non-limiting system that facilitates graph similarity analytics in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a set of graphs 502. A graph from the set of graphs 502 can be a data structure (e.g., a graph-structured dataset) that represents data as a network of nodes (e.g., vertices) where a relationship between the nodes can be represented as connections (e.g., edges). The set of graphs 502 can include information associated with one or more graphs. In an example, the set of graphs 502 can include first information for a first graph associated with a first data structure, second information for a second graph associated with a second data structure, etc. In a non-limiting example, the set of graphs 502 can include a first graph associated with a first data network (e.g., a first data network that corresponds to a first brain network, etc.), a second graph associated with a second data network (e.g., a second data network that corresponds to a second brain network, etc.). In an aspect, data associated with the set of graphs 502 can be fixed. In another aspect, the set of graphs 502 can be associated with a set of snapshots for the graphs that is captured over time. For instance, the set of graphs 502 can be a sequence of graphs over time. As such, the set of graphs 502 can be associated with a sequential network snapshot for the graphs. In one example, the set of graphs 502 can be associated with spatial-temporal data.

The set of graphs 502 can be provided to a fast graph entropy computation 504. The fast graph entropy computation 504 can generate a set of information indexes for the set of graphs 502. For example, the fast graph entropy computation 504 can generate a first information index for a first graph from the set of graphs 502, the fast graph entropy computation 504 can generate a second information index for a second graph from the set of graphs 502, etc. An information index generated by the fast graph entropy computation 504 can be an entropy measure for a graph from the set of graphs 502. For instance, the first information index for the first graph from the set of graphs 502 can be a first entropy measure for the first graph, the second information index for the second graph from the set of graphs 502 can be a second entropy measure for the second graph, etc. Furthermore, an information index generated by the fast graph entropy computation 504 can comprise linear computation complexity. For example, an amount of resources to perform the fast graph entropy computation 504 to generate the information index can be associated with linear complexity.

A fast graph similarity computation 506 can be performed based on the set of information indexes generated by the fast graph entropy computation 504. For instance, the fast graph similarity computation 506 can determine similarity between the set of graphs 502 based on the set of information indexes. In an aspect, the fast graph similarity computation 506 can determine an information distance between the set of graphs 502 based on the set of information indexes. The information distance can be, for example, a Jensen-Shannon divergence measurement associated with a probability distribution between the set of information indexes.

An analysis process 508 can be performed based on the fast graph similarity computation 506. The analysis process 508 can, for example, perform task-dependent analysis of the set of graphs 502 based on the fast graph similarity computation 506. In one example, the analysis process 508 can perform classification of the set of graphs 502 based on the fast graph similarity computation 506. In another example, the analysis process 508 can determine one or more predictions associated with the set of graphs 502 based on the fast graph similarity computation 506. In yet another example, the analysis process 508 can perform anomaly detection associated with the set of graphs 502 based on the fast graph similarity computation 506. In yet another example, the analysis process 508 can perform spatial-temporal analysis of the set of graphs 502 based on the fast graph similarity computation 506. In yet another example, the analysis process 508 can perform graph pattern matching and/or graph pattern searching of the set of graphs 502 based on the fast graph similarity computation 506. In an embodiment, the analysis process 508 can perform one or more machine learning processes to analyze the set of graphs 502 based on the fast graph similarity computation 506.

In certain embodiments, data visualization 510 can provide visual statistics associated with the set of graphs 502. For example, the data visualization 510 can provide spatial-temporal network diagnosis of the set of graphs. Additionally or alternatively, the data visualization 510 can provide human readable interpretation of information associated with the set of graphs 502. In an aspect, the data visualization 510 can provide visual statistics associated with the fast graph entropy computation 504. In another aspect, the data visualization 510 can provide visual statistics associated with the fast graph similarity computation 506. In yet another aspect, the data visualization 510 can provide visual statistics associated with the analysis process 508. In certain embodiments, the data visualization 510 can facilitate obtaining user data indicative of real-time user feedback associated with the set of graphs 502, the fast graph entropy computation 504, the fast graph similarity computation 506, and/or the analysis process 508. In certain embodiments, the set of graphs 502 and/or the analysis process 508 can be modified based on the user data.

Figure 6:
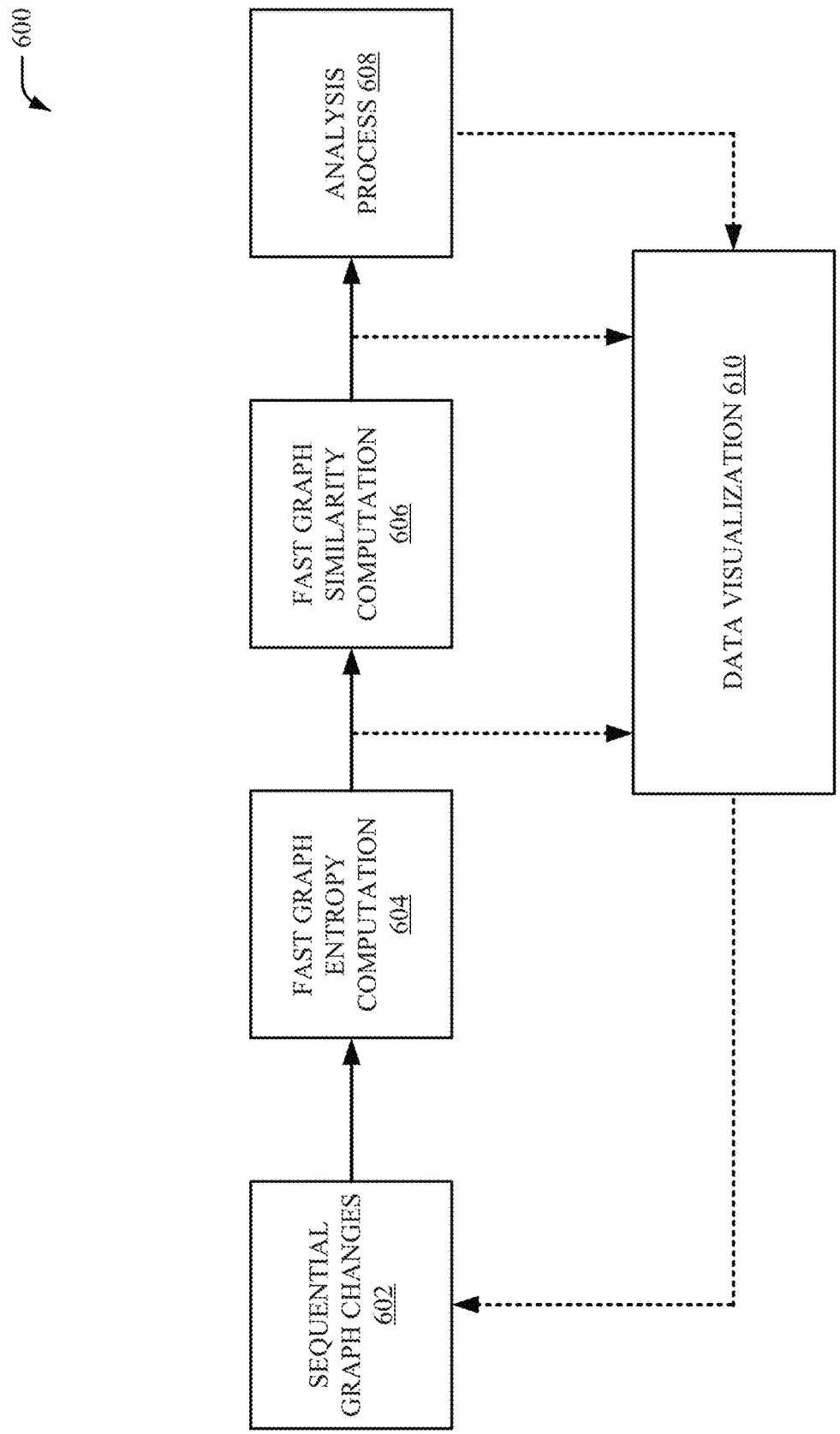
FIG. 6 illustrates another example, non-limiting system that facilitates graph similarity analytics in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes sequential graph changes 602. The sequential graph changes 602 can include information associated with changes in a graph sequence for a graph or a set of graphs. A graph can be a data structure (e.g., a graph-structured dataset) that represents data as a network of nodes (e.g., vertices) where a relationship between the nodes can be represented as connections (e.g., edges). In an aspect, data associated with the sequential graph changes 602 can change over time. The sequential graph changes 602 can be repeatedly reported. In a non-limiting example, the sequential graph changes 602 can be associated with a dynamic system such as, for example, an online social network, a dynamic networked system, an evolving network, or another dynamic system associated with one or more graphs.

The sequential graph changes 602 can be provided to a fast graph entropy computation 604. The fast graph entropy computation 604 can generate a set of information indexes for the sequential graph changes 602. For example, the fast graph entropy computation 604 can generate a first information index for first graph changes from the sequential graph changes 602, the fast graph entropy computation 604 can generate a second information index for second graph changes from the sequential graph changes 602, etc. An information index generated by the fast graph entropy computation 604 can be an entropy measure for a graph associated with the sequential graph changes 602. For instance, the first information index for the first graph from the sequential graph changes 602 can be a first entropy measure for a first graph associated with the sequential graph changes 602, the second information index for the second graph from the sequential graph changes 602 can be a second entropy measure for a second graph associated with the sequential graph changes 602, etc. Furthermore, an information index generated by the fast graph entropy computation 604 can comprise linear computation complexity. For example, an amount of resources to perform the fast graph entropy computation 604 to generate the information index can be associated with linear complexity. In an embodiment, an information index from the set of information indexes can be updated based on the sequential graph changes 602. For example, the first information index for the first graph from the sequential graph changes 602 can be updated based on a change associated with the first graph, the second information index for the second graph from the sequential graph changes 602 can be updated based on a change associated with the second graph, etc.

A fast graph similarity computation 606 can be performed based on the set of information indexes generated by the fast graph entropy computation 604. For instance, the fast graph similarity computation 606 can determine similarity between the sequential graph changes 602 based on the set of information indexes. In an aspect, the fast graph similarity computation 606 can determine an information distance between the sequential graph changes 602 based on the set of information indexes. The information distance can be, for example, a Jensen-Shannon divergence measurement associated with a probability distribution between the set of information indexes.

An analysis process 608 can be performed based on the fast graph similarity computation 606. The analysis process 608 can, for example, perform task-dependent analysis of the sequential graph changes 602 based on the fast graph similarity computation 606. In one example, the analysis process 608 can perform classification of the sequential graph changes 602 based on the fast graph similarity computation 606. In another example, the analysis process 608 can determine one or more predictions associated with the sequential graph changes 602 based on the fast graph similarity computation 606. In yet another example, the analysis process 608 can perform anomaly detection associated with the sequential graph changes 602 based on the fast graph similarity computation 606. In yet another example, the analysis process 608 can perform spatial-temporal analysis of the sequential graph changes 602 based on the fast graph similarity computation 606. In yet another example, the analysis process 608 can perform graph pattern matching and/or graph pattern searching of the sequential graph changes 602 based on the fast graph similarity computation 606. In an embodiment, the analysis process 608 can perform one or more machine learning processes to analyze the sequential graph changes 602 based on the fast graph similarity computation 606.

In certain embodiments, data visualization 610 can provide visual statistics associated with the sequential graph changes 602. For example, the data visualization 610 can provide spatial-temporal network diagnosis of the set of graphs. Additionally or alternatively, the data visualization 610 can provide human readable interpretation of information associated with the sequential graph changes 602. In an aspect, the data visualization 610 can provide visual statistics associated with the fast graph entropy computation 604. In another aspect, the data visualization 610 can provide visual statistics associated with the fast graph similarity computation 606. In yet another aspect, the data visualization 610 can provide visual statistics associated with the analysis process 608. In certain embodiments, the data visualization 610 can facilitate obtaining user data indicative of real-time user feedback associated with the sequential graph changes 602, the fast graph entropy computation 604, the fast graph similarity computation 606, and/or the analysis process 608. In certain embodiments, the sequential graph changes 602 and/or the analysis process 608 can be modified based on the user data.

Figure 7:
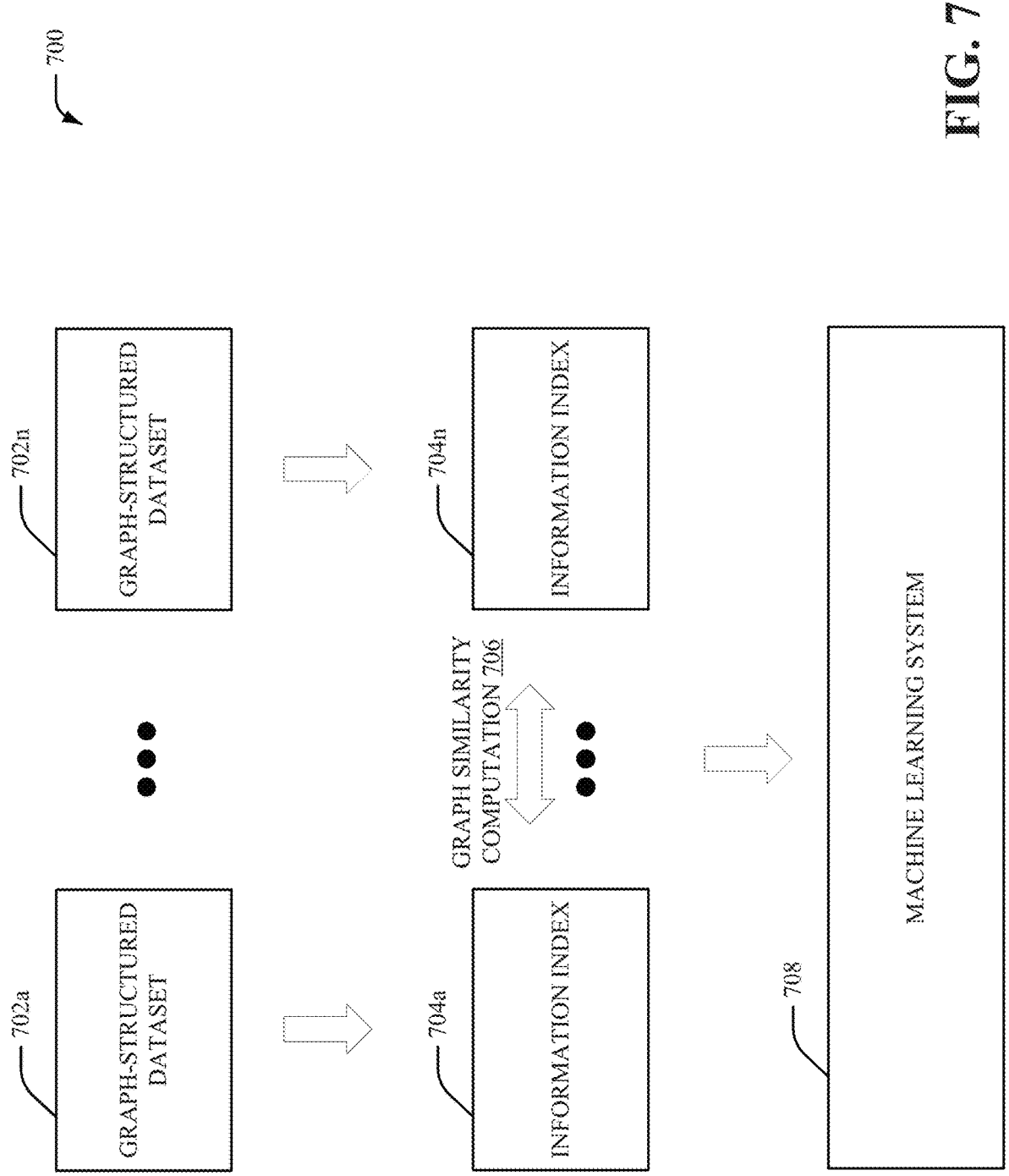
FIG. 7 illustrates yet another example, non-limiting system that facilitates graph similarity analytics in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes a set of graph-structured datasets 702a-n. For example, the graph-structured dataset 702a can be a first data structure (e.g., a first graph-structured dataset)

that represents first data as a first network of nodes (e.g., vertices) where a relationship between the nodes can be represented as connections (e.g., edges). Furthermore, the graph-structured dataset 702b can be a second data structure (e.g., a second graph-structured dataset) that represents second data as a second network of nodes (e.g., vertices) where a relationship between the nodes can be represented as connections (e.g., edges). The set of graph-structured datasets 702a-n can be converted into a set of information indexes 704a-n via a fast graph entropy computation process. For example, the information index 704a for the graph-structured dataset 702a can be a first entropy measure for the graph-structured dataset 702a, the information index 704n for the graph-structured dataset 702n from the sequential graph changes 602 can be an nth entropy measure for the graph-structured dataset 702n, etc. In an aspect, a graph similarity computation 706 can be performed between the set of information indexes 704a-n. For instance, the graph similarity computation 706 can be performed between the information index 704a and the information index 704n. In an aspect, the graph similarity computation 706 can determine similarity between the set of graph-structured datasets 702a-n by determining similarity between the set of information indexes 704a-n. In an embodiment, the graph similarity computation 706 can determine an information distance between the set of information indexes 704a-n. The information distance can be, for example, a Jensen-Shannon divergence measurement associated with a probability distribution between the set of information indexes 704a-n.

Additionally, a machine learning system 708 can perform one or more machine learning processes based on the set of information indexes 704a-n. For instance, the machine learning system 708 can perform one or more machine learning processes using information associated with the graph similarity computation 706. The machine learning system 708 can, for example, perform task-dependent analysis of the set of graph-structured datasets 702a-n based on the graph similarity computation 706 between the set of information indexes 704a-n. In one example, the machine learning system 708 can perform classification of the set of graph-structured datasets 702a-n based on graph similarity computation 706 between the set of information indexes 704a-n. In another example, the machine learning system 708 can determine one or more predictions associated with the set of graph-structured datasets 702a-n based on the graph similarity computation 706 between the set of information indexes 704a-n. In yet another example, the machine learning system 708 can perform anomaly detection associated with the set of graph-structured datasets 702a-n based on the graph similarity computation 706 between the set of information indexes 704a-n. In yet another example, the machine learning system 708 can perform spatial-temporal analysis of the set of graph-structured datasets 702a-n based on the graph similarity computation 706 between the set of information indexes 704a-n. In yet another example, the machine learning system 708 can perform graph pattern matching and/or graph pattern searching of the set of graph-structured datasets 702a-n based on the graph similarity computation 706 between the set of information indexes 704a-n.

Figure 8:
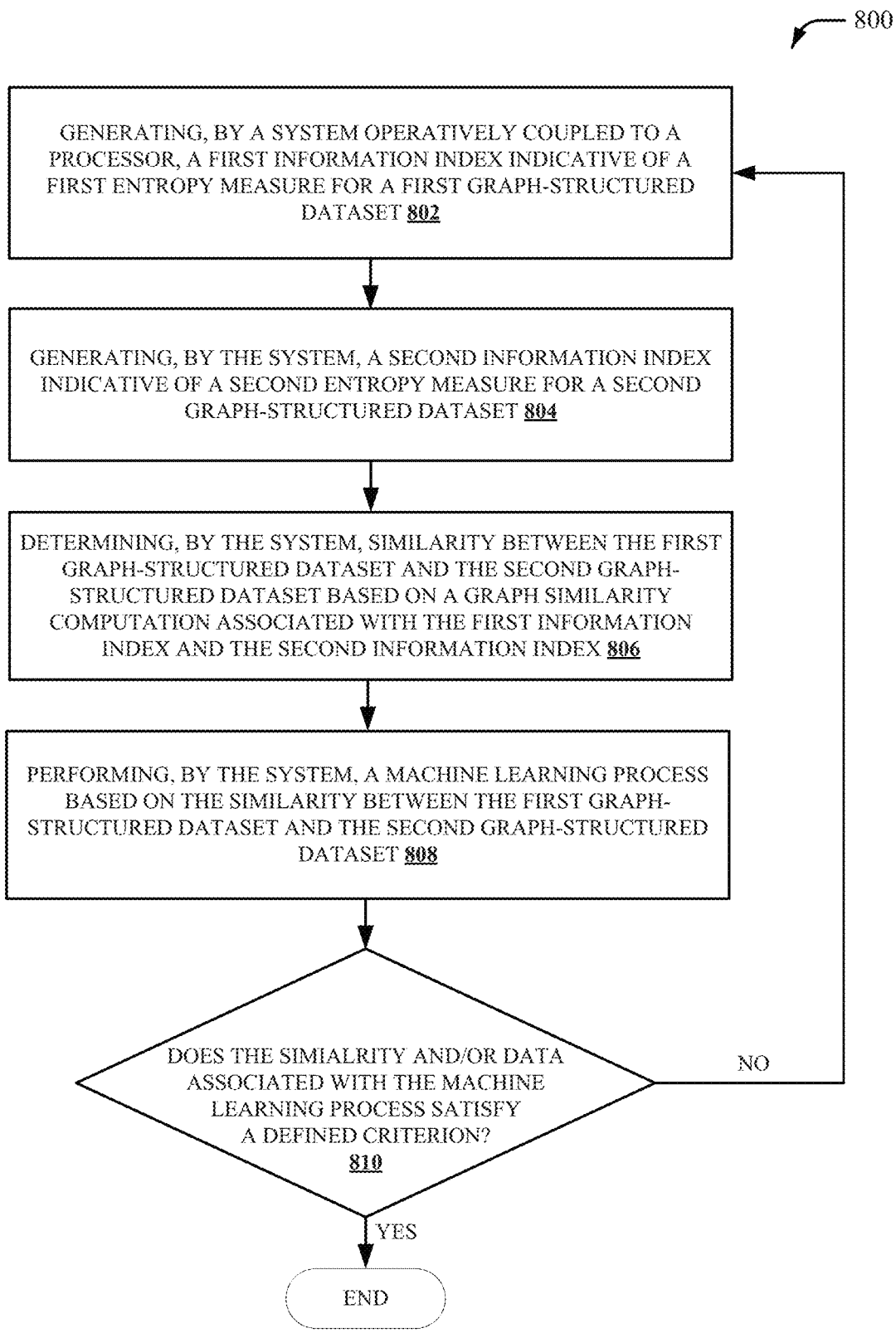
FIG. 8 illustrates a flow diagram of an example, non-limiting computer-implemented method for providing graph similarity analytics in accordance with one or more embodiments described herein.

FIG. 8 illustrates a flow diagram of an example, non-limiting computer-implemented method 800 for providing graph similarity analytics in accordance with one or more embodiments described herein. At 802, a first information index indicative of a first entropy measure for a first graph-structured dataset is generated by a system operatively coupled to a processor (e.g., by information component 104). The first entropy measure can be, for example, a measure of an average amount of data contained in the first graph-structured dataset. Furthermore, the first entropy measure can be, for example, a measure of an amount of uncertainty in data included in the first graph-structured dataset. In an embodiment, an average amount of data contained the first graph-structured dataset can be calculated. The first graph-structured dataset can be a first data structure (e.g., a first graph data structure) that represents first data as a first network of nodes (e.g., vertices) where a relationship between the nodes can be represented as connections (e.g., edges). Additionally, in certain embodiments, the first graph-structured dataset can be associated with metadata that provides attributes and/or properties for the first graph-structured dataset.

At 804, a second information index indicative of a second entropy measure for a second graph-structured dataset is generated by the system (e.g., by information component 104). The second entropy measure can be, for example, a measure of an average amount of data contained in the second graph-structured dataset. Furthermore, the second entropy measure can be, for example, a measure of an amount of uncertainty in data included in the second graph-structured dataset. In an embodiment, an average amount of data contained the second graph-structured dataset can be calculated. The second graph-structured dataset can be a second data structure (e.g., a second graph data structure) that represents second data as a second network of nodes (e.g., vertices) where a relationship between the nodes can be represented as connections (e.g., edges). Additionally, in certain embodiments, the second graph-structured dataset can be associated with metadata that provides attributes and/or properties for the second graph-structured dataset.

At 806, similarity between the first graph-structured dataset and the second graph-structured dataset is determined, by the system (e.g., by similarity component 106), based on a graph similarity computation associated with the first information index and the second information index. The graph similarity computation can determine, for example, an information distance between the first information index and the second information index. For instance, the information distance can be a Jensen-Shannon divergence measurement associated with a probability distribution between the first information index and the second information index.

At 808, a machine learning process is performed, by the system (e.g., by analysis component 302 and/or machine learning component 402), based on the similarity between the first graph-structured dataset and the second graph-structured dataset. For example, analysis of the first graph-structured dataset and the second graph-structured dataset can be performed based on the graph similarity computation associated with the first information index and the second information index. The machine learning process can, for example, perform task-dependent analysis of the first graph-structured dataset and the second graph-structured dataset based on the graph similarity computation associated with the first information index and the second information index. In one example, the machine learning process can perform classification of the first graph-structured dataset and the second graph-structured dataset based on the graph similarity computation associated with the first information index and the second information index. In another example, the machine learning process can determine one or more predictions associated with the first graph-structured dataset and the second graph-structured dataset based on the graph similarity computation associated with the first information index and the second information index. In yet another example, the machine learning process can perform anomaly detection associated with the first graph-structured dataset and the second graph-structured dataset based on the graph similarity computation associated with the first information index and the second information index. In yet another example, the machine learning process can perform spatial-temporal analysis of the first graph-structured dataset and the second graph-structured dataset based on the graph similarity computation associated with the first information index and the second information index. In yet another example, the machine learning process can perform graph pattern matching and/or graph pattern searching of the first graph-structured dataset and the second graph-structured dataset based on the graph similarity computation associated with the first information index and the second information index.

At 810, it is determined whether the similarity and/or data associated with the machine learning process satisfies a defined criterion. If no, the computer-implemented method 800 returns to 802. If yes, the computer-implemented method 800 ends.

In certain embodiments, the computer-implemented method 800 can include updating, by the system, the first information index based on a set of sequential changes associated with the first graph-structured dataset. Additionally or alternatively, in certain embodiments, the computer-implemented method 800 can include updating, by the system, the second information index based on a set of sequential changes associated with the second graph-structured dataset. In certain embodiments, the computer-implemented method 800 can include generating, by the system, visual data indicative of visual statistics associated with the similarity between the first graph-structured dataset and the second graph-structured dataset. In certain embodiments, the computer-implemented method 800 can include receiving, by the system, user data indicative of real-time user feedback associated with the machine learning process. Furthermore, the determining the similarity between the first graph-structured dataset and the second graph-structured dataset can include, for example, improving the machine learning process.

Figure 9:
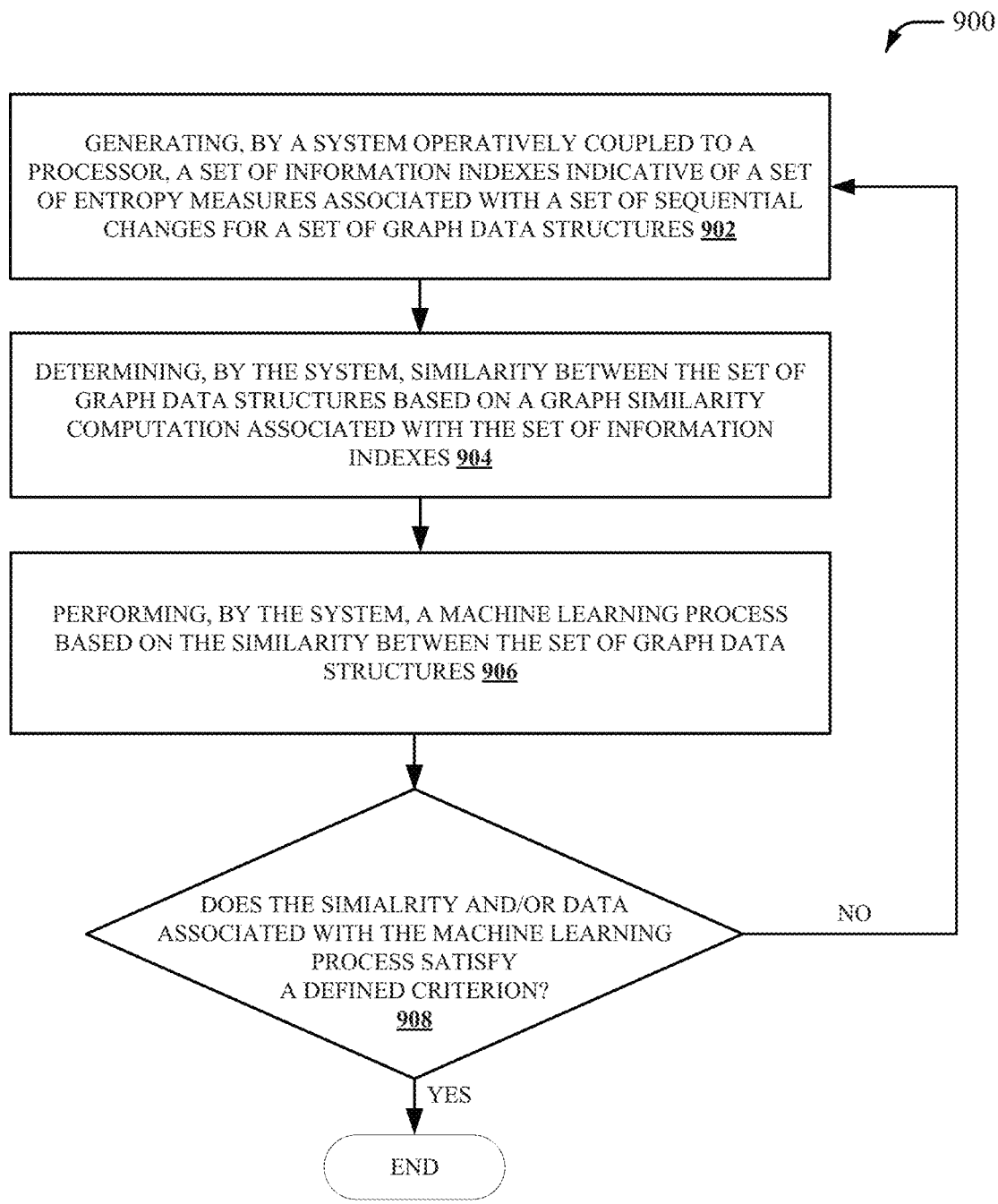
FIG. 9 illustrates a flow diagram of another example, non-limiting computer-implemented method for providing graph similarity analytics in accordance with one or more embodiments described herein.

FIG. 9 illustrates a flow diagram of an example, non-limiting computer-implemented method 900 for providing graph similarity analytics in accordance with one or more embodiments described herein. At 902, a set of information indexes indicative of a set of entropy measures associated with a set of sequential changes for a set of graph data structures is generated by a system operatively coupled to a processor (e.g., by information component 104). The set of entropy measures can be, for example, one or more measures of an average amount of data contained in the set of graph data structures. Furthermore, the set of entropy measures can be, for example, a measure of an amount of uncertainty in data included in the set of graph data structures. In an embodiment, an average amount of data contained the set of graph data structures can be calculated. A graph data structure from the set of graph data structures can be a data structure (e.g., a graph-structured dataset) that represents data as a network of nodes (e.g., vertices) where a relationship between the nodes can be represented as connections (e.g., edges). Additionally, in certain embodiments, the set of graph data structures can be associated with metadata that provides attributes and/or properties for the set of graph data structures.

At 904, similarity between the set of graph data structures is determined, by the system (e.g., by similarity component 106), based on a graph similarity computation associated with the set of information indexes. The graph similarity computation can determine, for example, one or more information distances between the set of information indexes. For instance, the information distance can be a Jensen-Shannon divergence measurement associated with one or more probability distributions between the set of information indexes.

At 906, a machine learning process is performed, by the system (e.g., by analysis component 302 and/or machine learning component 402), based on the similarity between the set of graph data structures. For example, analysis of the set of graph data structures can be performed based on the graph similarity computation associated with the set of information indexes. The machine learning process can, for example, perform task-dependent analysis of the set of graph data structures based on the graph similarity computation associated with the set of information indexes. In one example, the machine learning process can perform classification of the set of graph data structures based on the graph similarity computation associated with the set of information indexes. In another example, the machine learning process can determine one or more predictions associated with the set of graph data structures based on the graph similarity computation associated with the set of information indexes. In yet another example, the machine learning process can perform anomaly detection associated with the set of graph data structures based on the graph similarity computation associated with the set of information indexes. In yet another example, the machine learning process can perform spatial-temporal analysis of the set of graph data structures based on the graph similarity computation associated with the set of information indexes. In yet another example, the machine learning process can perform graph pattern matching and/or graph pattern searching of the set of graph data structures based on the graph similarity computation associated with the set of information indexes.

At 908, it is determined whether the similarity and/or data associated with the machine learning process satisfies a defined criterion. If no, the computer-implemented method 900 returns to 902. If yes, the computer-implemented method 900 ends.

In certain embodiments, the computer-implemented method 900 can include updating, by the system, the set of information indexes based on a set of sequential changes associated with the set of graph data structures. In certain embodiments, the computer-implemented method 900 can include generating, by the system, visual data indicative of visual statistics associated with the similarity between the set of graph data structures. In certain embodiments, the computer-implemented method 900 can include receiving, by the system, user data indicative of real-time user feedback associated with the machine learning process. Furthermore, the determining the similarity between the set of graph data structures can include, for example, improving the machine learning process.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least generating an information index, determining a similarity between graph-structured datasets, and/or performing a machine learning process are established from a combination of electrical and mechanical components and circuitry, a human is unable to replicate or perform a graph similarity analytics process and/or a machine learning process associated with the graph similarity analytics component 102 (e.g., the information component 104, the similarity component 106, the visualization component 202, the analysis component 302 and/or the machine learning component 402) disclosed herein. For example, a human is unable to perform a graph similarity analytics process, perform a machine learning process, etc.

Figure 10:
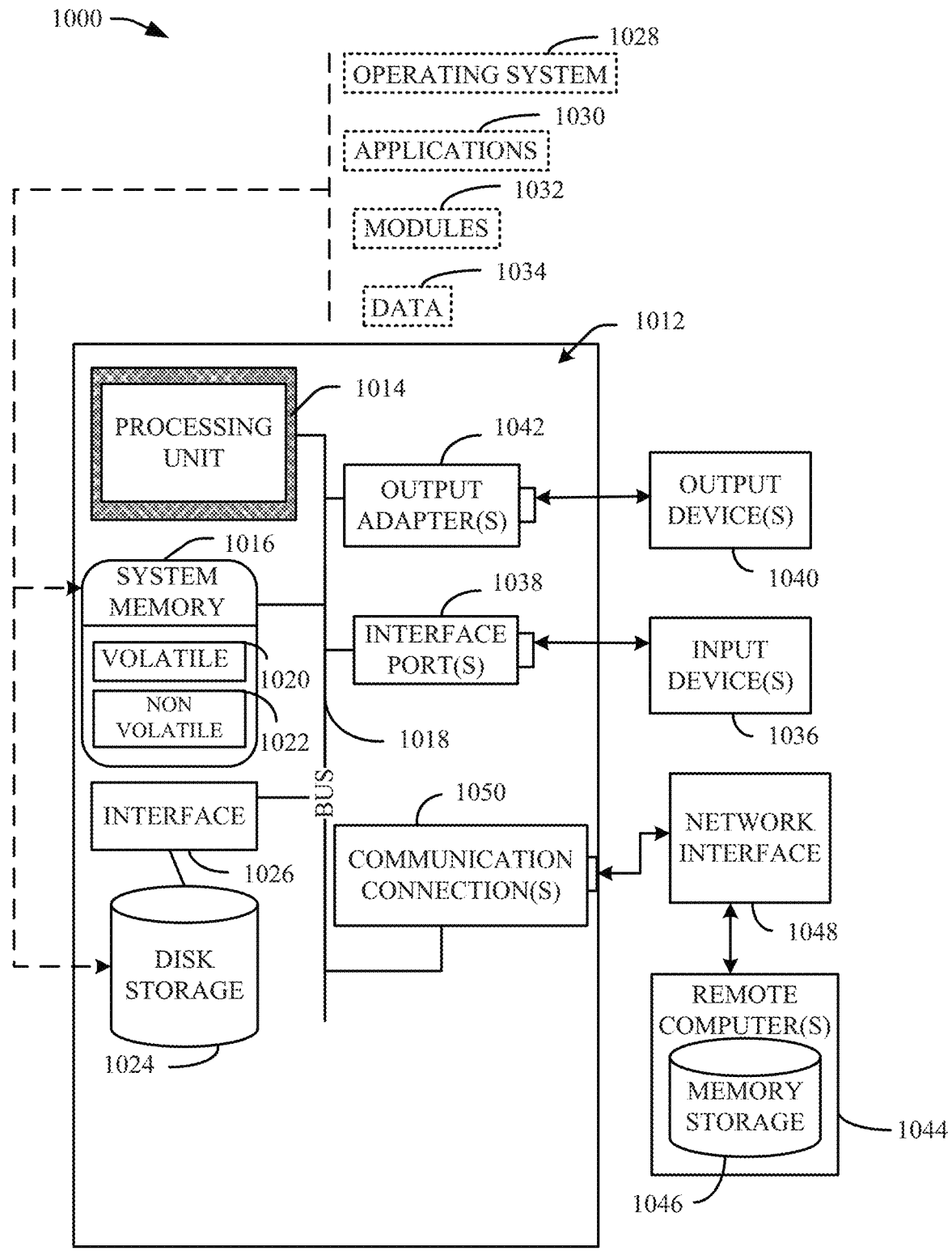
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
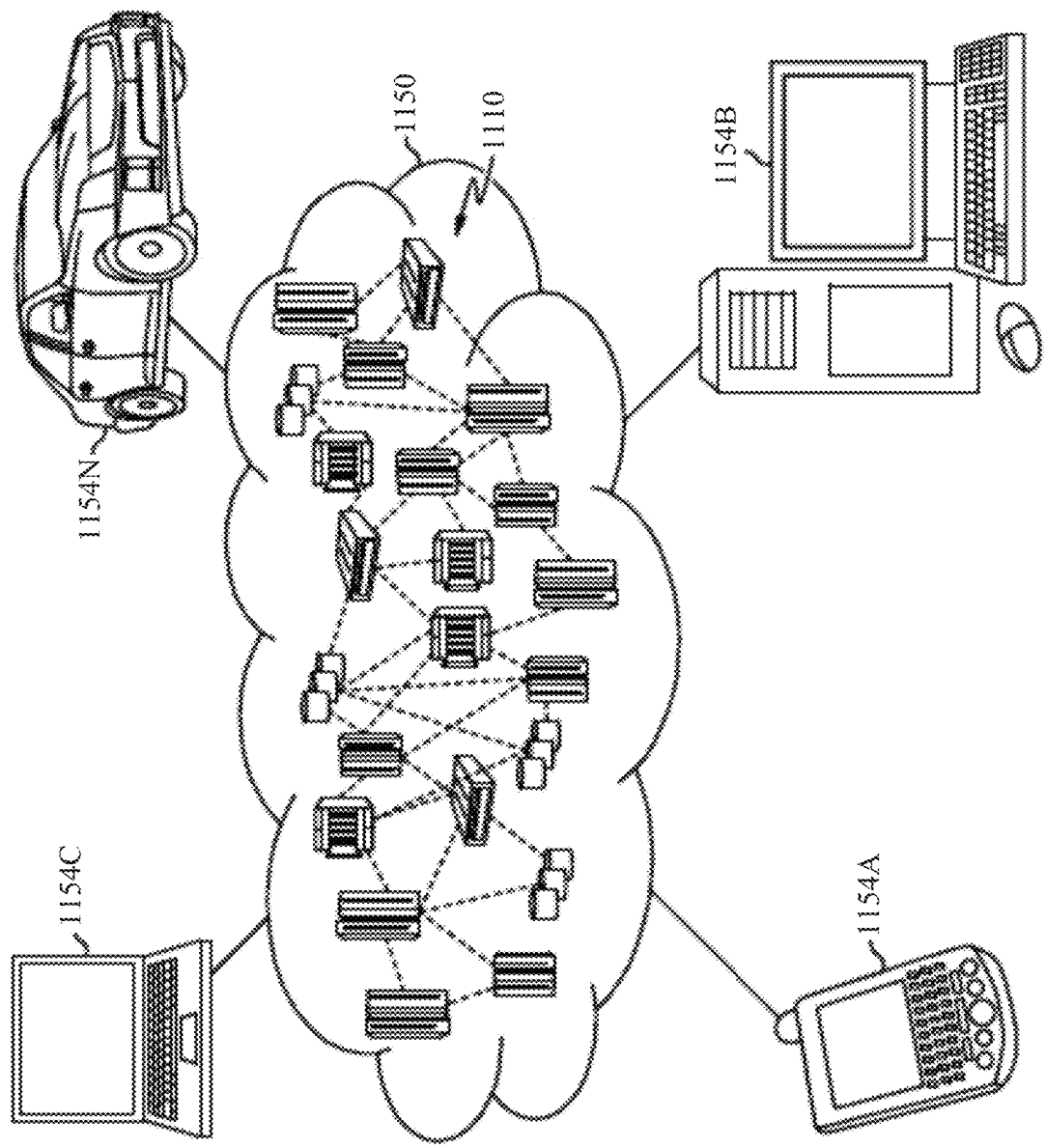
FIG. 11 illustrates a block diagram of an example, non-limiting cloud computing environment in accordance with one or more embodiments of the present invention.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
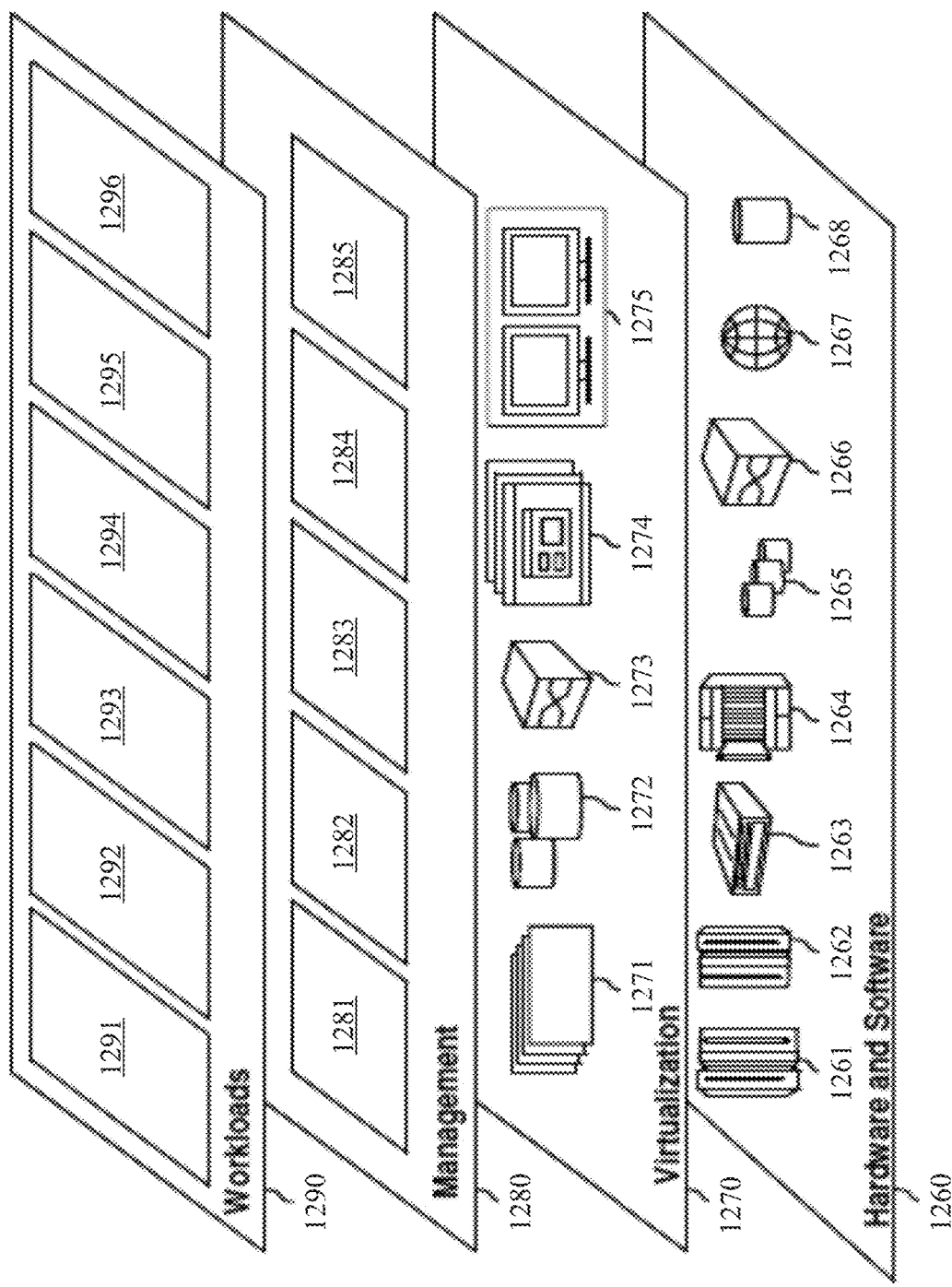
FIG. 12 illustrates a block diagram of example, non-limiting abstraction model layers in accordance with one or more embodiments of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and graph similarity analytics software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes the computer executable components stored in the memory, wherein the computer executable components comprise:
   an information component that:
      generates a first information index indicative of a first entropy measure for a first graph-structured dataset that represents a first dynamic network that changes over time, and a second information index indicative of a second entropy measure for a second graph-structured dataset that represents a second dynamic network that changes over the time;
      receives first change data that represents a first set of sequential changes to the first graph-structured dataset over the time and second change data that represents a second set of sequential changes to the second graph-structured dataset over the time; and
      updates the first information index based on the first change data, resulting in an updated first information index, and updates the second information index based on the second change data, resulting in an updated second information index;
   a similarity component that determines a measure of similarity between the first graph-structured dataset and the second graph-structured dataset based on a similarity computation between the updated first information index and the updated second information index;
   an analysis component that employs an artificial intelligence system to select and perform one of a plurality of task-dependent analyses for the first set of sequential changes and the second set of sequential changes based on the measure of similarity; and
   a visualization component that generates on a display device, visual data comprising dynamic visual elements indicative of visual statistics associated with the measure of similarity, wherein visual characteristics of the dynamic visual elements are displayed in an altered format based on the measure of similarity, and wherein the visual characteristics are selected from a group consisting of: content, visual property, size, hue and shading.

2. The system of claim 1, wherein the similarity component determines the measure of similarity based on an information distance between the updated first information index and the updated second information index.

3. The system of claim 1, wherein the visualization component generates the visual data based on user data indicative of real-time user feedback associated with the artificial intelligence system.

4. The system of claim 1, wherein the information component generates the updated first information index and the updated second information index to facilitate reduced memory consumption to determine the measure of similarity between the first graph-structured dataset and the second graph-structured dataset.

5. A computer-implemented method, comprising:
generating, by a system operatively coupled to a processor, a first information index indicative of a first entropy measure for a first graph-structured dataset that represents a first dynamic network that changes over time;
generating, by the system, a second information index indicative of a second entropy measure for a second graph-structured dataset that represents a second dynamic network that changes over the time;
receiving, by the system, first change data that represents a first set of sequential changes to the first graph-structured dataset over the time;
updating, by the system, the first information index based on the first change data, resulting in an updated first information index;
receiving, by the system, second change data that represents a second set of sequential changes to the second graph-structured dataset over the time;
updating, by the system, the second information index based on the second change data, resulting in an updated second information index;
determining, by the system, based on a similarity computation between the updated first information index and the updated second information index, a measure of similarity between the first graph-structured dataset and the second graph-structured dataset;
employing, by the system, an artificial intelligence system to select and perform one of a plurality of task-dependent analyses for the first set of sequential changes and the second set of sequential changes based on the measure of similarity; and
generating, by the system on a display device, visual data comprising dynamic visual elements indicative of visual statistics associated with the measure of similarity, wherein visual characteristics of the dynamic visual elements are displayed in an altered format based on the measure of similarity, and wherein the visual characteristics are selected from a group consisting of: content, visual property, size, hue and shading.

6. The computer-implemented method of claim 5, wherein the generating the first information index comprises calculating an average amount of data contained in the first graph-structured dataset.

7. The computer-implemented method of claim 5, wherein the determining the measure of similarity comprises determining an information distance between the updated first information index and the updated second information index.

8. The computer-implemented method of claim 5, further comprising:
receiving, by the system, user data indicative of real-time user feedback associated with the artificial intelligence system, and wherein generating the visual data is based on the user data.

9. The computer-implemented method of claim 5, wherein the determining the measure of similarity comprises improving a machine learning process of the artificial intelligence system.

10. A computer program product comprising a non-transitory computer readable medium having program instructions embodied therewith, the program instructions executable by a processor to cause the processor to:
generate, by the processor, a first graph data structure for a first graph-structured dataset that represents a first dynamic network that changes over time;
generate, by the processor, a second graph data structure for a second graph-structured dataset that represents a second dynamic network that changes over the time;
receive, by the processor, first change data that represents a first set of sequential changes to the first graph-structured dataset over the time;
update, by the processor, a first information index of the first graph data structure based on the first change data, resulting in an updated first information index;
receive, by the processor, second change data that represents a second set of sequential changes to the second graph-structured dataset over the time;
update, by the processor, a second information index of the second graph data structure based on the second change data, resulting in an updated second information index;
determine, by the processor, a measure of similarity between the first graph-structured dataset and the second graph-structured dataset based on a similarity computation between the updated first information index and the updated second information index;
employ, by the processor, an artificial intelligence system to select and perform one of a plurality of task-dependent analyses for the first set of sequential changes and the second set of sequential changes based on the measure of similarity; and
generate on a display device, visual data comprising dynamic visual elements indicative of visual statistics associated with the measure of similarity, wherein visual characteristics of the dynamic visual elements are displayed in an altered format based on the measure of similarity, and wherein the visual characteristics are selected from a group consisting of: content, visual property, size, hue and shading.

11. The computer program product of claim 10, wherein the program instructions are further executable by the processor to cause the processor to:
determine, by the processor, the measure of similarity based on an information distance between the updated first information index and the updated second information index.

12. The computer program product of claim 10, wherein the processor generates the visual data based on user data indicative of real-time user feedback associated with the artificial intelligence system.

* * * * *